(12) United States Patent
Gibby

(10) Patent No.: US 8,397,251 B2
(45) Date of Patent: Mar. 12, 2013

(54) STICKER MEDIA DISK

(75) Inventor: Lon Gibby, Colbert, WA (US)

(73) Assignee: Gibby Media Group, Spokane Valley, WA (US)

( * ) Notice: Subject to any disclaimer, the term of this patent is extended or adjusted under 35 U.S.C. 154(b) by 0 days.

(21) Appl. No.: 13/158,066

(22) Filed: Jun. 10, 2011

(65) Prior Publication Data

US 2011/0239240 A1    Sep. 29, 2011

Related U.S. Application Data

(63) Continuation of application No. PCT/US2009/067660, filed on Dec. 11, 2009.

(60) Provisional application No. 61/122,313, filed on Dec. 12, 2008.

(51) Int. Cl.
*G11B 7/26* (2006.01)

(52) U.S. Cl. ........................................... 720/719

(58) Field of Classification Search ............ 720/719
See application file for complete search history.

(56) References Cited

U.S. PATENT DOCUMENTS

| 4,671,978 | A |  | 6/1987 | Kato et al. |  |
|---|---|---|---|---|---|
| 4,879,710 | A | * | 11/1989 | Iijima | 720/719 |
| 4,983,437 | A | * | 1/1991 | Merrick | 428/42.1 |
| 5,791,467 | A | * | 8/1998 | Mahone | 206/308.1 |
| 5,935,673 | A | * | 8/1999 | Mueller | 428/64.1 |
| 6,054,009 | A | * | 4/2000 | Cote et al. | 156/249 |
| 6,262,969 | B1 | * | 7/2001 | Ito et al. | 720/719 |
| 6,385,164 | B1 | * | 5/2002 | Winicki | 720/719 |
| 7,384,723 | B2 |  | 6/2008 | Kakuta et al. |  |
| 7,390,546 | B2 |  | 6/2008 | Yasuda |  |
| 7,410,681 | B2 |  | 8/2008 | Ohishi |  |
| 2004/0139458 | A1 | * | 7/2004 | Noda | 720/718 |
| 2005/0001931 | A1 |  | 1/2005 | Kahn |  |
| 2006/0188173 | A1 |  | 8/2006 | Zhang et al. |  |
| 2007/0033605 | A1 | * | 2/2007 | Watanabe | 720/719 |
| 2007/0162921 | A1 | * | 7/2007 | King | 720/719 |

FOREIGN PATENT DOCUMENTS

| JP | 2007310998 A | 11/2007 |
|---|---|---|
| KR | 20000009919 A | 2/2000 |
| KR | 20030072791 A | 9/2003 |

OTHER PUBLICATIONS

"The New Heir for Traditional DVD Media Bends the Rules, Without Breaking Them." <<http://lastminutephotographer.com/news/news.cfm/hurl/id%7C5903>> Retrieved on Dec. 15, 2008, 3 pages.

* cited by examiner

*Primary Examiner* — Mark Blouin
(74) *Attorney, Agent, or Firm* — Lee & Hayes, PLLC

(57) ABSTRACT

A sticker media disk may be easily stuck on an old CD, DVD, or other optical disk as a base. The combination then becomes a media disk completely playable with content in audio players, computers drives, DVD, and/or high definition (HD) disk players.

20 Claims, 5 Drawing Sheets

STICKER MEDIA DISK

This application is a continuation of PCT International Application No. PCT/US09/67660, filed Dec. 11, 2009, which claims the benefit of U.S. Provisional Application No. 61/122,313, filed Dec. 12, 2008, both of which are incorporated herein by reference.

BACKGROUND

Manufacturers are constantly looking for ways to reduce their material costs for producing items in order to compete in the marketplace. Additionally, environmental concerns have prompted many companies and individuals to reduce, reuse, and/or recycle products to minimize the impact on the environment. Yet, every year, even in the face of these considerations, billions of new compact disks (CDs) and digital video disks (DVDs) are produced and distributed to consumers. These disks hold audio content, video content, computer software, advertisements, and all sorts of other media.

Every month, approximately 50 tons of CDs become obsolete, outdated, damaged, or otherwise unwanted. One can imagine that a similar amount of DVDs also become unwanted each month. This amounts to a huge waste of resources. Today, CDs and DVDs are recyclable, but the reality is that very few actually are recycled. Part of the reason that more disks are not recycled is the difficulty on the part of consumers to locate and ship unwanted disks to recycling centers.

DETAILED DESCRIPTION

Overview

This application discloses a sticker media disk (the "StickerDisk™") comprising a playable CD, DVD, CD-ROM or DVD-ROM sticker. The StickerDisk may be easily stuck on any old CD, DVD, or other optical disk as a base. It then becomes a media disk completely playable with content in audio players, computers drives, DVD, and/or high definition (HD) disk players. With the concern for the environment, the high cost of oil based polycarbonates and the expense of packaging and shipping and printing, the StickerDisk is an attractive alternative to the billions of disks manufactured in the conventional way. Old scratched disk's now can have a new life and can be recycled when a StickerDisk is attached.

Figure 1:
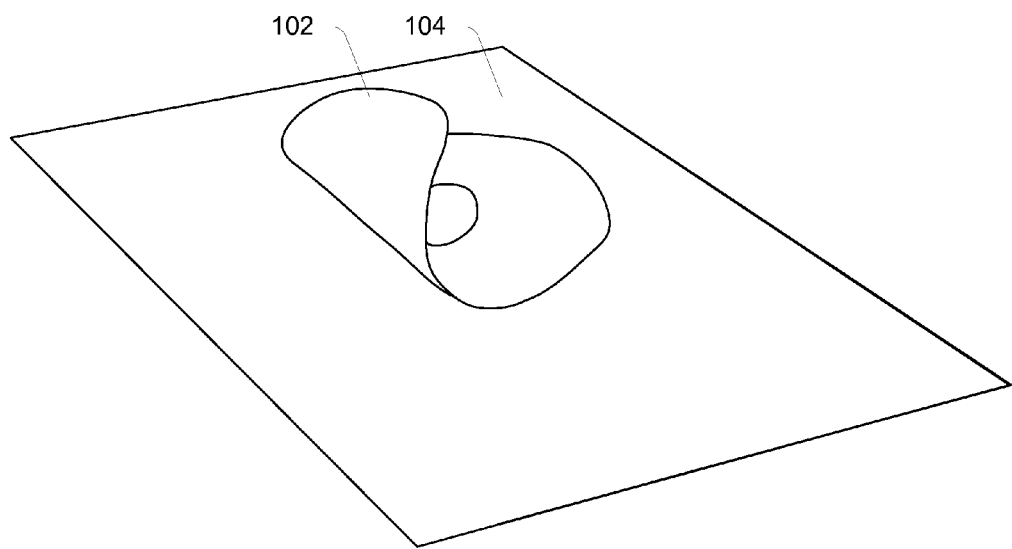
FIG. 1 is a schematic diagram showing an illustrative sticker media disk being peeled off of a release backing.

FIG. 1 is a schematic diagram of an illustrative StickerDisk 102. Because of the StickerDisk's flexibility, it can be sent in magazines and newspapers. It can be stuck on a temporary scratch free surface, such as a release backing 104 on a page of a magazine, and peeled off when it is time to stick it on an old disk. StickerDisks can be applied to one or both sides of an old optical disk. StickerDisks 102 may be configured as read-write disks or as regular disks with pre-recorded content and data.

Illustrative Content

StickerDisk can contain DVD, DVD-ROM, CD-ROM, AUDIO CD content, or any other desired data in any desired format. With GibbyDisk™ software, available from Gibby® Media Group of Spokane Valley, Wash., the StickerDisk 102 can contain video, print, data, stills, games slide shows, Internet navigation, and the like, all on one disk. Additionally, using GibbyDisk media engine software, the disk can be configured to play in computers and/or console multimedia players, including, for example, a PC running a Microsoft®, Apple®, or Linux® operating system, a home DVD player, a home or car audio CD player, and/or a HD disk player (e.g., HD DVD or Blu-Ray® disk), depending on how the StickerDisk 102 is configured. In one illustrative example, the StickerDisk 102 has a 4.7 gigabyte capacity.

Illustrative Adhesion

The adhesion process used to connect the StickerDisk 102 to an old disk should have properties that allow it to remain flat during use and not become dislodged. Specifically, the StickerDisk 102 should have properties that allow it to remain flat and not become dislodged during constant angular velocities and/or constant linear velocities produced by optical disc drives (e.g., up to 10,000 revolutions per minute or 52× speed in some implementations). In some implementations, the adhesion technique should be operable at temperatures typically experienced inside a computer or other multimedia device. Specifically, the adhesion technique should be operable at about 39 degrees Celsius (C). Various temporary and permanent adhesion processes are envisioned including electrostatic adhesion, temporary and permanent chemical adhesives, and the like. In any event, the temporary backings to which the StickerDisk 102 is initially adhered (e.g., in the newspaper, magazine, consumer product, or other carrier media) may comprise a material that inhibits permanent adhesion and/or promotes release of the StickerDisk 102 from the backing (e.g., existing backing materials for conventional stickers or decals). Examples of some chemical adhesives that may be used include corn- and rapeseed-based polymers, standard high density plastic adhesions, as well as other known adhesives.

Electrostatic adhesion may alternatively be used to the sticker media disk to an old disk surface. In that case, the materials of the sticker media disk may be chosen promote electrostatic adhesion with materials of conventional optical disks. Additionally or alternatively, the sticker media disk may be exposed to a chemical or mechanical process to instill an electrostatic charge. In some examples, peeling the StickerDisk 102 from its release backing 104 may instill an electrostatic charge in the StickerDisk 102 suitable to adhere the StickerDisk 102 to a used optical disk.

Illustrative Consumer Installation Process

Figure 2:
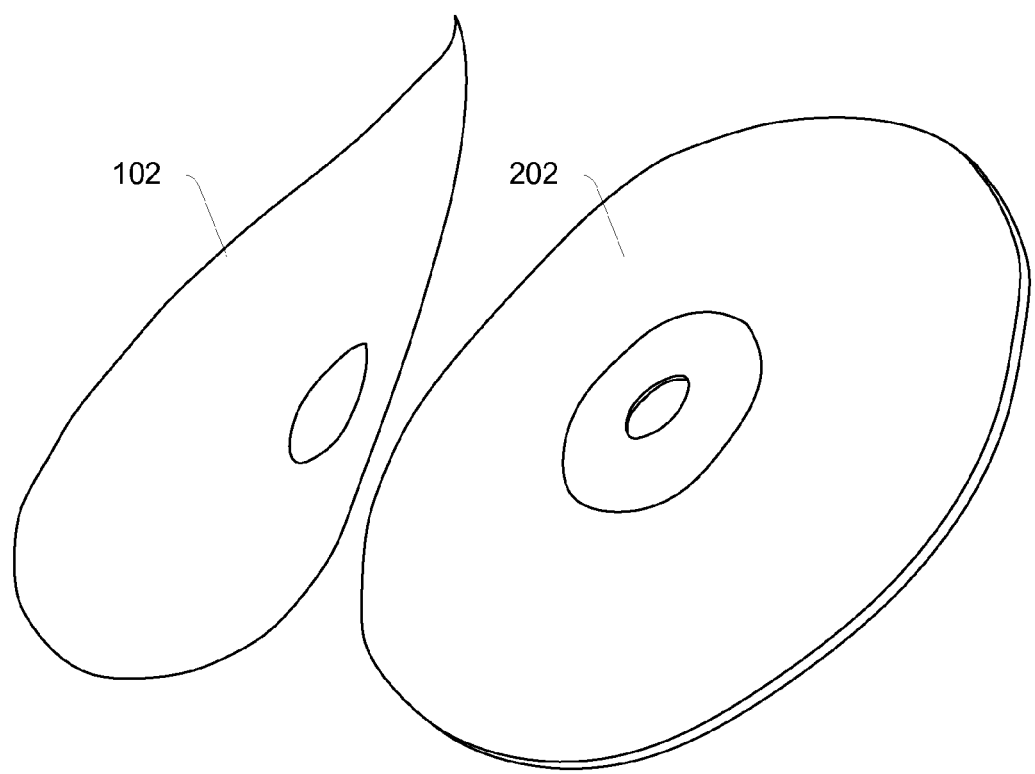
FIG. 2 is a schematic diagram showing the illustrative sticker media disk of FIG. 1 before it is applied to an optical disk.
Figure 3:
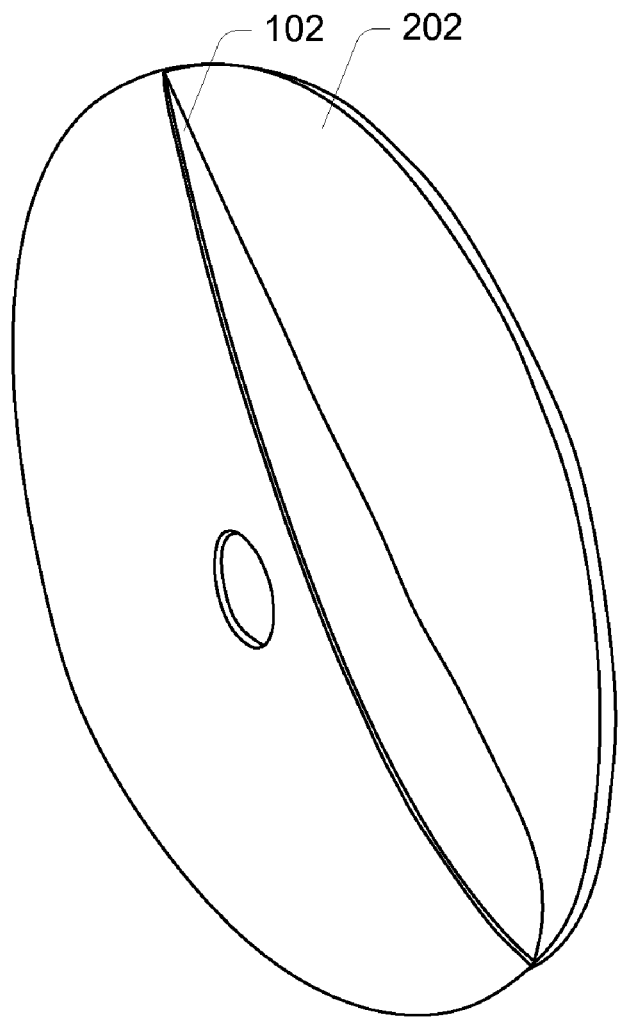
FIG. 3 is a schematic diagram showing the illustrative sticker media disk of FIG. 1 as it is being applied to the optical disk.
Figure 4:
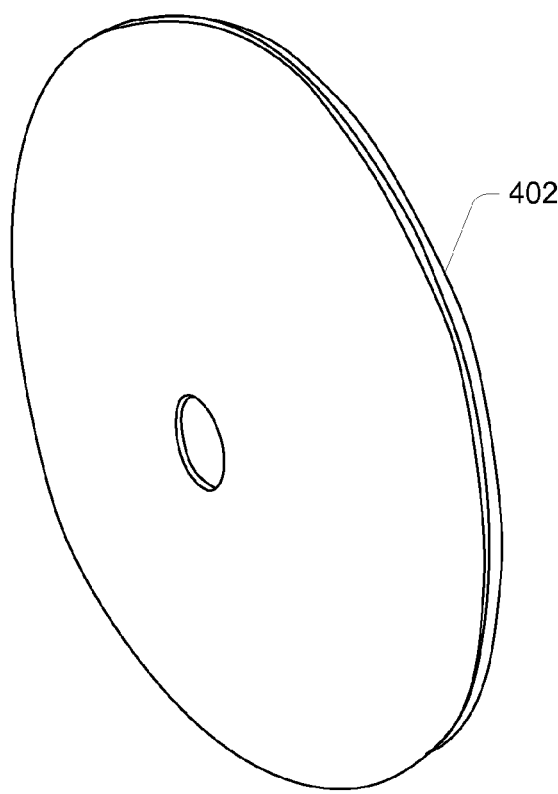
FIG. 4 is a schematic diagram showing the illustrative sticker media disk of FIG. 1 adhered to the optical disk.

FIGS. 2-4 are progressive views showing a StickerDisk 102 being adhered to an old optical disk. When the consumer receives the disk 102 they may simply peel it away from the temporary backing 104 it is mounted on and align it to a disk they want to use as a base 202. Standard label alignment tools may be helpful but will not be required. The adhesion process will maintain tight edges 402 securely on the base disk 202 when the StickerDisk 102 is applied with even pressure by hand.

Illustrative Disk Construction

Figure 5:
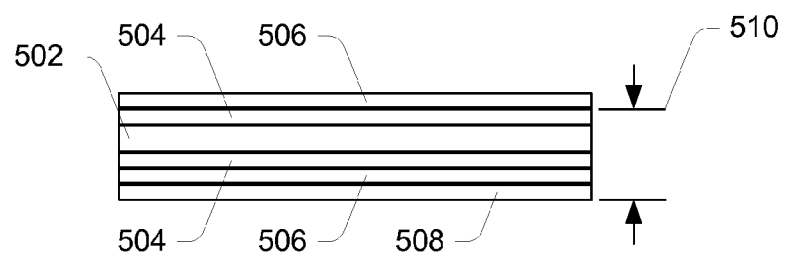
FIG. 5 is a partial cross sectional view of the illustrative sticker media disk of FIG. 1.

FIG. 5 illustrates one embodiment, in which the StickerDisk 102 may include, among other things:

1. a thin layer of silver or high grade aluminum metal 502 for storing data,
2. a flexible, protective coating 504 (e.g., rapeseed natural based plastics, standard polycarbonates used in CDs and DVDs, or other materials providing sufficient flexibility and structural support) applied to one or both sides of the metal 502,
3. a sealant 506 (e.g., a known sealant used with existing optical disks),
4. an adhesion layer 508 (e.g., electrostatic or chemical).

In the case of electrostatic adhesion, the adhesion layer 508 may comprise a static cling film material chosen to have an electrostatic affinity for materials of conventional optical disks. For example, the static cling film material may be formed of a polymeric plastic. In one example, the cling film may be formed by an extrusion process or a coextrusion process.

Illustrative Dimensions

Typically, the StickerDisk 102 will be between about 50 and about 150 micrometers thick 510. However, in other implementations, StickerDisks may be thinner or thicker than this range. By contrast, conventional optical disks typically have thicknesses of over one millimeter (an order of magnitude thicker). In one example, the StickerDisk will be between about 90 and 110 micrometers thick. In that case, when applied to a standard optical disk (e.g., CD or DVD), the whole assembly will have a combined thickness 510 less than about 1.5 millimeters.

Illustrative Disk Manufacturing Process

For mass replication the StickerDisk 102 may be molded or stamped on existing optical disk manufacturing machines. A retrofit may be required and some modifications that allow for material to be applied in a uniform thin format. The mold type and configuration may also be modified to account for the thinner material. Another manufacturing process may include extruding or rolling sheets of the StickerDisk material and then cutting or punching the individual sticker disks out of the sheets, much like a cookie cutter.

Illustrative Coating and Sealing

The protective coating 504 may be applied as the disk is spinning to provide a uniform shield and covering over the plastic. Alternatively, in the sheet example described above, the protective coating could be applied to the sheet of material before the disks are cut out. In that case, the protective coating could be a co-molded, co-extruded, sprayed on, or otherwise applied to the sheet of StickerDisk material. These or any techniques used in the production of existing optical disks may be used to apply the protective coating. Likewise, the sealant 506 may be applied using any of the foregoing techniques.

In some embodiments, the StickerDisk 102 will contain one thin layer of metal 502 surrounded by the protective coating 504 and 506 sealant on both sides, as shown in FIG. 5. However, in other embodiments, the protective coating 504 and/or sealant 506 may be applied on only one side of the metal layer 502.

In embodiments using adhesive, the adhesive 508 may be applied as a last step in the process and will typically be applied by another dedicated machine on the line. There will be a thin paper film protector (not shown) placed over the adhesive until it is applied to the newspaper, magazine, brochure, mailer, consumer product, or other temporary backing. In some cases, the film may be omitted because the last step in the process will attach the adhesive surface of the StickerDisk 102 to a newspaper, magazine, brochure, mailer, or other temporary backing 104 directly. It is anticipated that existing newspaper insert and polybag machines may be modified to secure the StickerDisks 102 to their temporary backing 104 for delivery.

Illustrative Methods of Adhering Stickerdisk to Backing

There are several methods that may be used to adhere the disk to a brochure, magazine, publication, newspaper, consumer product, or other backing. One way is using electrostatic adhesion, another way is using the adhesive of the StickerDisk in combination with a release backing, and another way is with a clear patch over the disk. Furthermore, the StickerDisk may be adhered to a brochure, magazine, publication, newspaper, or consumer product by way of a plastic pocket, where the plastic pocket may be substantially fixed to the brochure, magazine, publication or newspaper and may be manually opened to expose the disk housed therein.

Illustrative Process of Making and Using

Figure 6:
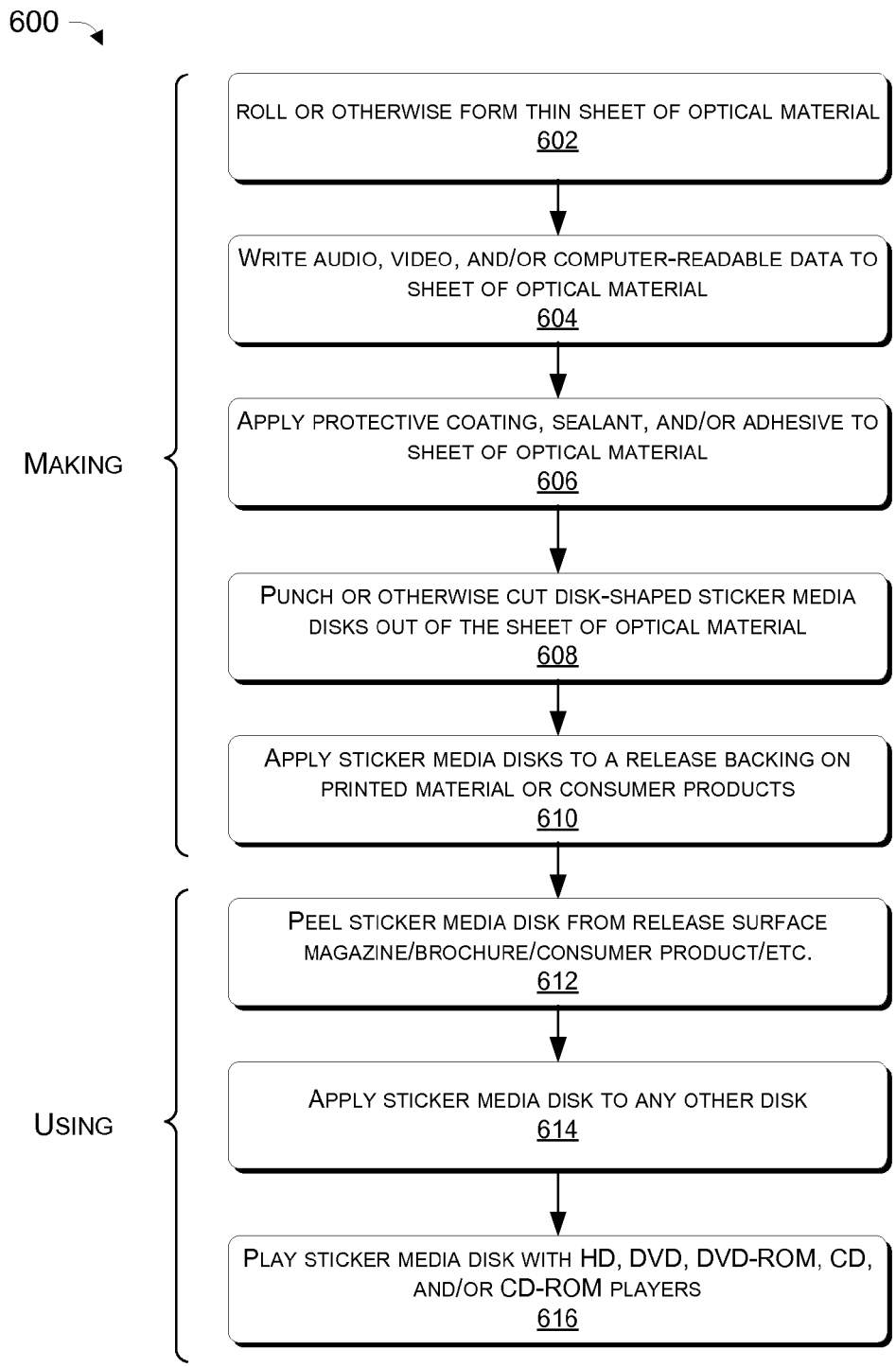
FIG. 6 is a flow chart of an illustrative method of making and using a sticker media disk.

FIG. 6 is a flow chart illustrating an illustrative method 600 of making and using a sticker media disk, such as the StickerDisk 102 of FIG. 1.

The method 600 begins, at 602, with the formation of a thin sheet of optical material, such as silver or aluminum. The thin sheet of material may be formed by rolling, or by any other process used in the manufacturing of conventional optical disks. At 604, audio, video, and/or computer readable data is written to the sheet of optical material. As discussed above, the data written to the optical material may be in a variety of different formats and may be readable by a variety of different devices.

A protective coating, sealant, and/or adhesive is applied to the sheet of optical material at 606, using any of the processes and materials described above. At 608, the sticker media disks are punched or otherwise cut from the sheet of optical material and, at 610, are applied to a release backing on a printed material (e.g., magazine, brochure, newspaper, or the like) or a consumer product.

Once made, a StickerDisk 102 may be used according to acts 612-616. At 612, the StickerDisk 102 is peeled from the temporary backing 104. The StickerDisk 102 may then be applied, at 614, to any other disk to use as a base 202. At 616, the StickerDisk 102 may be played in a suitable device, such as a HD, DVD, DVD-ROM, CD, and/or CD-ROM device.

The product and processes described herein benefit the environment but also should save a tremendous amount of money and resources in manufacturing costs, shipping costs, packaging and the cost of broken disks in mail.

In various implementations, the method acts described above need not necessarily be performed in the order described and one or more steps may be omitted entirely. Likewise, variations in the sticker media disk construction are also possible. For example, the protective coating, sealant, and/or adhesive may be applied after the disks are punched out of the sheet of optical material. Also for example, the adhesive may be omitted entirely when electrostatic adhesion is used. Still further variations in the sticker media disks and the processes of making and using such sticker media disks are described here. These and other variations are included within the scope of the instant disclosure.

What is claimed is:

1. A sticker-disk configured to adhere to an optical disk, the sticker-disk comprising:
a flexible disk comprising a thin layer of material for storing optical data, the flexible disk comprising a first side and a second side;

a flexible coating for protecting and supporting the thin layer of material, the flexible coating comprising a substantially flat stratum disposed on the second side of the flexible disk;

a sealant disposed on the second side of the flexible disk over the flexible coating; and an adhesive layer disposed on the first side of the flexible disk to adhere the sticker disk to an optical disk.

2. The sticker-disk configured to adhere to an optical disk described in claim 1, wherein the flexible coating is disposed on the first side of the flexible disk and the sealant is disposed on the first side of the flexible disk on the flexible coating and the adhesive layer is disposed on the first side of the flexible disk on the sealant.

3. The sticker-disk configured to adhere to an optical disk described in claim 1, wherein the adhesive layer comprises an electrostatic adhesive.

4. The sticker-disk configured to adhere to an optical disk described in claim 1, wherein the adhesive layer comprises a chemical adhesive.

5. The sticker-disk configured to adhere to an optical disk described in claim 3, wherein the chemical adhesive comprises a temporary chemical adhesive or a permanent chemical adhesive.

6. The sticker-disk configured to adhere to an optical disk described in claim 1, wherein the sticker-disk has a thickness of between about 50 micrometers and about 150 micrometers.

7. The sticker-disk configured to adhere to an optical disk described in claim 1, wherein the optical data stored on the substantially disk-shaped thin layer of material comprises:
    text data;
    video data;
    print data;
    still data;
    game data; and/or
    internet navigation data.

8. The sticker-disk configured to adhere to an optical disk described in claim 1, wherein the sticker-disk is configured to be playable in:
    compact disk players;
    digital video disk players;
    computer optical disk players; and
    console multimedia players.

9. The sticker-disk configured to adhere to an optical disk described in claim 1, wherein the disk-shaped thin layer of material comprises silver or high grade aluminum.

10. The sticker-disk configured to adhere to an optical disk described in claim 1, wherein the sticker-disk comprises at least a 4.7 gigabyte data capacity.

11. The sticker-disk configured to adhere to an optical disk described in claim 1, wherein the adhesive layer is configured to keep adhesion of the sticker-disk to the optical disk while operating at temperatures experienced inside a computer or a multimedia device.

12. The sticker-disk configured to adhere to an optical disk described in claim 1, wherein the sticker-disk is removably disposed on a retail item.

13. A print media comprising:
    a sticker-disk configured to adhere to an optical disk and removably disposed on a page of content of the print media, the sticker-disk comprising;
    a substantially disk-shaped flexible layer of material for storing optical data, the substantially disk-shaped flexible layer of material comprising a first side and a second side;
    a flexible coating for protecting and supporting the substantially disk-shaped flexible layer of material, the flexible coating being disposed on the second side;
    a sealant disposed on the flexible coating on the second side; and
    an adhesive layer for adhering the sticker disk to an optical disk, the adhesive layer being disposed on the first side; and
    an attachment mechanism for disposing the sticker-disk on the page of content.

14. The printed media described in claim 13, wherein the attachment mechanism for disposing the sticker-disk on the page of content comprises a temporary backing that inhibits permanent adhesion and promotes release of the sticker-disk from the page of content.

15. The printed media described in claim 13, wherein the attachment mechanism for disposing the sticker-disk on the page of content comprises an electrostatic adhesion.

16. The printed media described in claim 13, wherein the attachment mechanism for disposing the sticker-disk on the page of content comprises a patch or sleeve holding the sticker-disk.

17. An assembly comprising:
    an optical disk;
    a sticker-disk adhered to the optical disk, the sticker-disk comprising;
    a substantially disk-shaped flexible layer of material for storing optical data, the substantially disk-shaped flexible layer of material comprising a first side and a second side;
    a flexible coating for protecting and supporting the substantially disk-shaped flexible layer of material, the flexible coating being disposed on the second side;
    a sealant disposed on the flexible coating on the second side; and
    an adhesive layer for adhering the sticker-disk to the optical disk, the adhesive layer being disposed on the first side.

18. The optical disk described in claim 17, wherein the adhesive layer is for an electrostatic adhesion.

19. The optical disk described in claim 17, wherein the adhesive layer is for a chemical adhesion.

20. The optical disk described in claim 17, wherein the chemical adhesion is configured to be either a temporary chemical adhesive or a permanent chemical adhesive.

* * * * *